United States Patent [19]
Schaefers et al.

[11] Patent Number: 5,645,144
[45] Date of Patent: Jul. 8, 1997

[54] CONTROL MECHANISM FOR SLIDING PANEL

[75] Inventors: Andrew G. Schaefers; George K. Austin, Jr., both of Newberg, Oreg.

[73] Assignee: A-Dec, Inc., Newberg, Oreg.

[21] Appl. No.: 517,870

[22] Filed: Aug. 22, 1995

[51] Int. Cl.[6] .................................................. F16D 65/24
[52] U.S. Cl. ............................................ 188/170; 108/148
[58] Field of Search ........................... 188/170, 67, 38, 188/382, 751 R; 108/148

[56] References Cited

U.S. PATENT DOCUMENTS

| | | | |
|---|---|---|---|
| 669,489 | 3/1901 | Hudson | 108/148 |
| 4,696,378 | 9/1987 | Brooks | 188/170 |
| 5,111,913 | 5/1992 | Granbom | 188/170 |
| 5,363,942 | 11/1994 | Osada | 188/170 |

*Primary Examiner*—Matthew C. Graham
*Attorney, Agent, or Firm*—Klarquist Sparkman Campbell Leigh & Whinston, LLP

[57] ABSTRACT

The present invention provides a mechanism for guiding and controlling the movement of a sliding panel relative to a fixed panel. The mechanism comprises a shaft attached to the sliding panel that passes through an elongate opening in a bracket attached to the fixed panel. Disposed about the shaft is a brake that is normally urged against the bracket by a spring member, thereby fixing the position of the sliding panel. Also disposed about the shaft is an actuating member that, when actuated, releases the contact between the brake and the bracket, allowing the sliding member to move along the path defined by the elongate opening.

5 Claims, 2 Drawing Sheets

CONTROL MECHANISM FOR SLIDING PANEL

FIELD OF THE INVENTION

The present invention relates generally to a mechanism for guiding and controlling the movement of a sliding panel. More particularly, the present invention provides a mechanism for guiding and controlling the vertical movement of a panel of a cabinet that may carry dental equipment.

BACKGROUND OF THE INVENTION

A number of methods have been proposed for guiding the movement of a sliding panel with relation to a fixed panel, while at the same time providing means for braking that movement and fixing the position of the sliding panel. There remains a need, however, for mechanisms that simply, elegantly, and reliably combine these two functions. Preferably, such mechanisms also retain sufficient flexibility that they may be employed in a wide variety of contexts. The present invention fulfills these and other needs.

SUMMARY OF THE INVENTION

It is an object of the invention to provide a mechanism that combines (1) means for guiding the path of movement of a sliding member in relation to a fixed member together and (2) means for braking and controlling that movement.

In one embodiment of the present invention, a guide is attached to the sliding member and extends through an elongate opening, e.g., a linear vertical slot, in the fixed member. The elongate opening defines the path of movement of the sliding member. A spring member urges a brake into contact with the fixed member, thereby fixing the position of the sliding member with relation to the fixed member. The position of the sliding member may be changed by actuating an actuator to release the brake and allow the sliding member to move along the path defined by the elongate opening in the fixed member.

In a preferred embodiment, the guide is a shaft around which the brake is disposed. Preferably, the brake is pneumatically operated.

The foregoing and other features and advantages of the invention will become more apparent from the following detailed description and accompanying drawings.

DETAILED DESCRIPTION OF A PREFERRED EMBODIMENT

Figure 1:
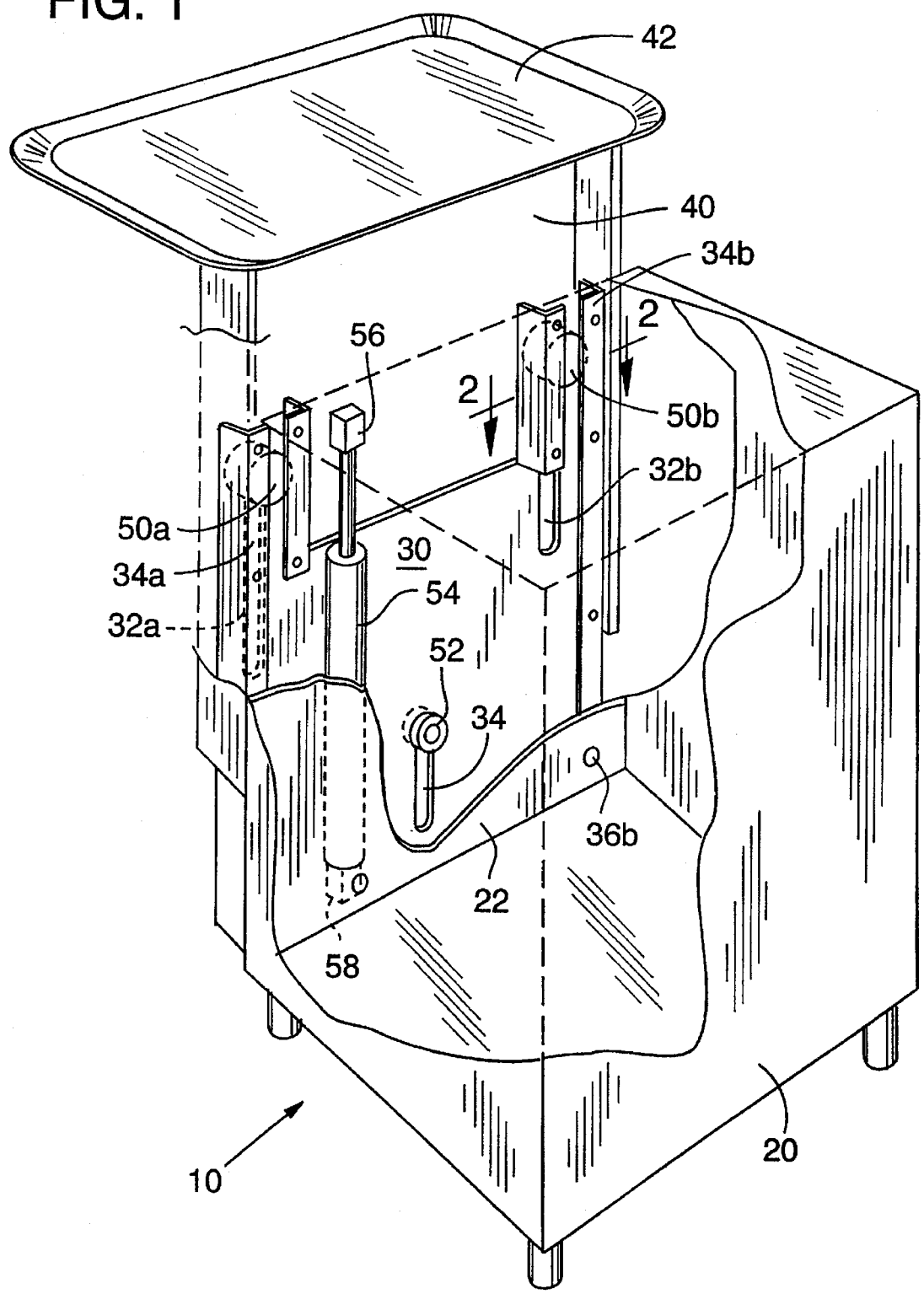
FIG. 1 shows a dental cabinet, part of which supports a tray, the vertical adjustment of which tray is controlled by a control mechanism in accordance with the present invention. The cabinet is shown in partial cutaway view to show the control mechanism.

While the present invention is susceptible of embodiment in many different forms and would be useful in a wide variety of apparatus, there is shown in the drawings and will herein be described in detail a preferred embodiment of the invention. The present disclosure is, however, to be considered an exemplification of the principles of the invention and is not intended to limit the broad aspect of the invention to the embodiment illustrated. Those skilled in the art will appreciate the utility of this invention, which is not limited to the specific embodiments and materials described herein.

Figure 2:
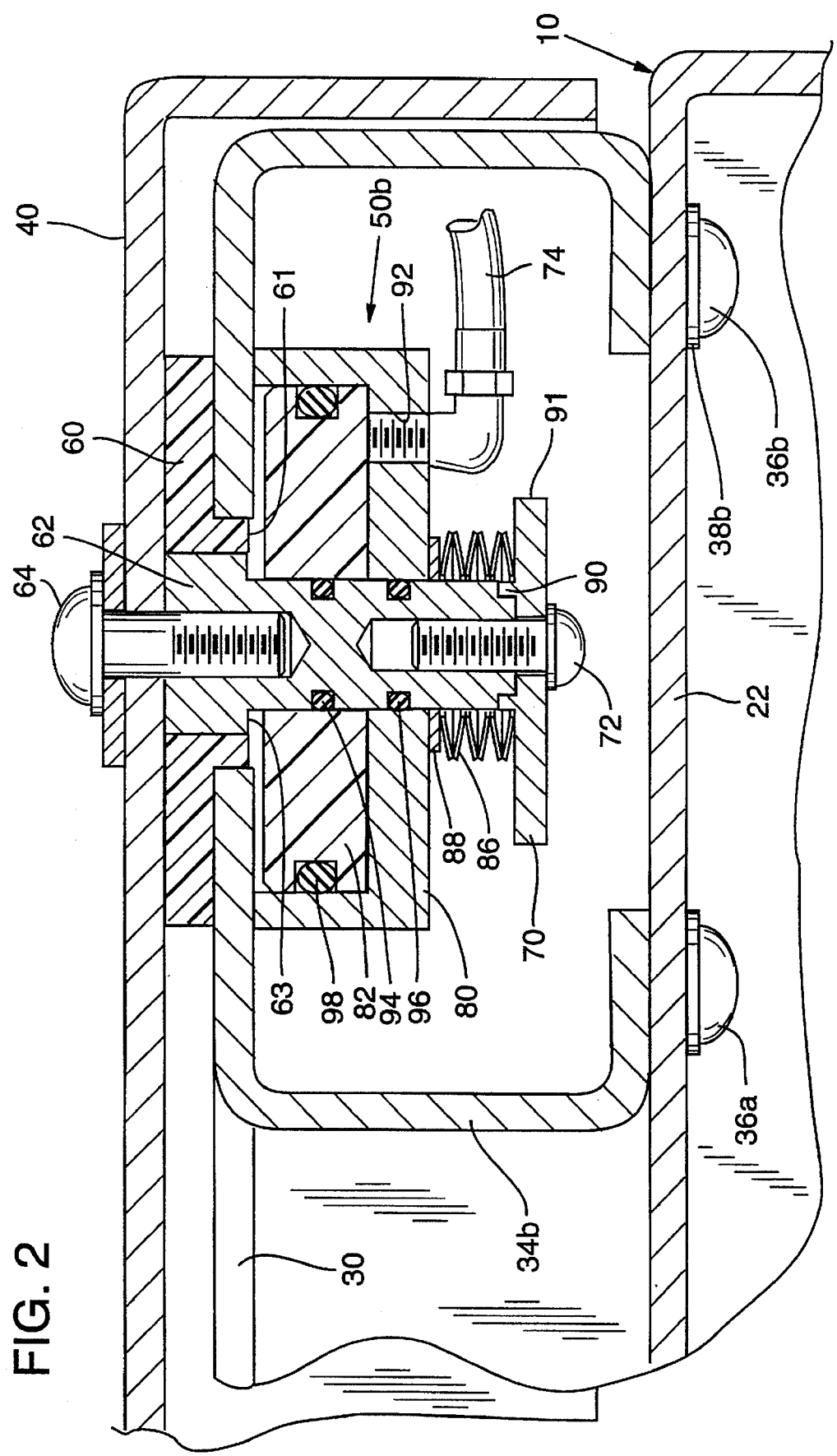
FIG. 2 shows a cross-section of the control mechanism taken along line 2—2 of FIG. 1.

A preferred embodiment of the invention is illustrated in FIGS. 1 and 2. The dental cabinet 10 comprises an enclosed stand 20 having a side wall 22. A carriage frame 30 is fastened to the exterior of the wall 22. The carriage frame includes three elongate openings (in FIG. 1, vertical linear slots 32a, 32b, and 34). An upper portion of the frame 30 is configured to define two spaced apart brackets 34a, 34b. Fasteners 36a, 36b through the brackets join the frame 30 to the wall 22 (FIG. 2).

A carriage 40 is slidably mounted on brackets 34a, 34b by control mechanisms 50a, 50b, which extend through slots 32a, 32b, respectively. The carriage 40 generally covers the frame 30 and may carry, for example, a tray 42 for dental instruments. It will be apparent, however, that any of a variety of components may be supported by the carriage.

The control mechanisms 50a, 50b serve both to guide and control the movement of the carriage 40 with relation to the frame 30. Normally, the control mechanisms 50a, 50b, fix the vertical position of carriage 40 relative to the frame 30 by clamping the carriage to the brackets 34a, 34b. However, when actuated, control mechanisms 50a, 50b release the carriage from the brackets 34a, 34b, allowing the carriage 40 to move vertically.

A guide 52 extends from the carriage 40 through the slot 34 in the frame 30. The guide 52 is shaped to guide the lower portion of the carriage 40 and to prevent the movement of the lower portion of the carriage either from side-to-side or away from the stand 20.

The path of the movement of the carriage 40 is defined by the slots 32a, 32b, 32c. For example, it would be possible to define a non-linear path of movement of the carriage cover by means of non-linear slots, with only minor adjustments to other structures.

The weight of the carriage 40 is counterbalanced by an air spring 54. The air spring 54 is attached by a first end 56 to the carriage 40 and by a second end 58 to the carriage frame 30.

A control mechanism 50b is shown in detail in FIG. 2. A flanged bushing 60 having a shoulder 61 surrounds one end of a cylindrical guide shaft 62 having a shoulder 63, which shaft is fastened to the carriage 40 by a threaded fastener 64. Preferably, the bushing 60 is made from a polymeric material such as that sold as Delrin®.

A spring retainer disk 70 is attached to the other end of the guide shaft 62 by a threaded fastener 72. Preferably, the retainer 72 is keyed (such as shown at 90) to the shaft 62 to orient a flat 91 on the otherwise circular disk adjacent to a fluid port 92, as explained below.

A piston housing 80 is slidably disposed around the guide shaft 62. A piston 82 is disposed around the guide shaft 62 within the piston housing 80. The piston 82 contacts the shoulder 61 of flanged bushing 60 and shoulder 63 of guide shaft 62. Since shoulder 61 of flanged bushing 60 and shoulder 63 of guide shaft 62, extend beyond the bracket 34b, there is a gap or space between the piston 82 and the bracket 34b, as shown in FIG. 2.

The piston housing 80 is normally urged against the bracket 34b by a spring member 86, which is disposed about guide shaft 62 between a washer 88 and the retainer disk 70. As shown in FIG. 2, the spring member 86 comprises six belville-type spring washers arranged as three facing pairs, although other well known spring means may be used.

A fluid port 92 extends through the piston housing 80 to allow a fluid, such as air, to be delivered under pressure into the interior of the piston housing 80 between the piston housing 80 and the piston 82. The flat 91 on retainer disk 70 provides clearance for connecting a conduit 74 to the fluid port 92, as shown in FIG. 2.

Fluid pressure inside the piston housing 80 urges the piston housing 80 to travel along the guide shaft 62, away from contact with the bracket 34b. As piston housing 80 is forced away from contact with the bracket 34b, the carriage cover 40 is released and its vertical position can be readily readjusted, whether manually, mechanically, or by other means known in the art. The fluid pressure secures the piston 82 in contact with the shoulder 61 of flanged bushing 60 and shoulder 63 of guide shaft 62.

The piston 82 is preferably made from a material such as Delrin® to allow the piston housing 80 to easily slide away from the carriage and to allow the carriage cover 40 to easily move. O-ring seals 94, 96, 98 prevent the pressurized air from escaping the housing.

The path of movement of the carriage cover 40 is defined by the configuration of the slots 32a, 32b. In FIG. 1, the slotted opening, and thus the movement of the carriage 44 with relation to the rear wall of the stand 42, is linear and vertical. The control mechanisms 50a, 50b, therefore both guide and control the movement of the carriage 40.

When the control mechanism 50b is deactuated by venting the air in the housing via conduit 74, the spring member 86 once again urges the piston housing 80 against the bracket 34b, fixing the vertical position of the carriage 40.

Having illustrated and described the principles of the invention in a preferred embodiment, it should be apparent to those skilled in the art that the invention can be modified in arrangement and detail without departing from such principles. Those of ordinary skill in the art will appreciate, for example, that the guide could be attached to the fixed member and extend through a elongate opening in the sliding member and that the piston housing 80 and piston 82, the spring member 86, or other structures of the control mechanisms 50a, 50b could be replaced by other mechanical, electrical, pneumatic, or other mechanisms known in the art while providing a mechanism that both controls and guides the vertical movement of a sliding panel with relation to a fixed panel in substantially the same manner as described above.

What is claimed is:

1. A mechanism for guiding and controlling the movement of a sliding member in relation to a fixed member comprising:

a guide attached to the sliding member and extending through an elongate opening in the fixed member, the elongate opening defining a path of movement of the sliding member, wherein the guide comprises a brake that includes;

a piston housing and a piston disposed within the piston housing, wherein the piston housing normally contacts the fixed member and wherein actuation of the actuator causes the piston housing to move away from contact with the fixed member;

a spring member that normally urges the piston housing into contact with the fixed member, thereby fixing the position of the sliding member with relation to the fixed member; and an actuator that, when actuated, releases the contact between the piston housing and the fixed member, allowing the sliding member to move along the path defined by the opening.

2. The mechanism of claim 1 wherein the guide is a shaft and the brake is disposed about the shaft.

3. The mechanism of claim 2 wherein the piston is secured on the shaft adjacent to the fixed member to guide movement of the sliding member.

4. The mechanism of claim 3 wherein the piston is secured by fluid pressure directed between the piston and the piston housing.

5. A mechanism for guiding and controlling the movement of a sliding member in relation to a fixed member compromising:

a guide attached to the sliding member and extending through an elongate opening in the fixed member, the elongate opening defining a path of movement of the sliding member, wherein the guide comprises a brake and, wherein the guide is a shaft and the piston housing and piston are disposed about the shaft.

a spring member that normally urges the into contact with the fixed member, thereby fixing the position of the sliding member with relation to the fixed member; and an actuator that, when actuated, releases the contact between the and the fixed member, allowing the sliding member to move along the path defined by the opening.

* * * * *

UNITED STATES PATENT AND TRADEMARK OFFICE
CERTIFICATE OF CORRECTION

PATENT NO. : 5,645,144
DATED : July 8, 1997
INVENTOR(S) : Schaefers et al.

It is certified that error appears in the above-identified patent and that said Letters Patent is hereby corrected as shown below:

In the Title:

"Control Mechanism for Sliding Panel" should read --Guide and Brake Mechanism for a Sliding Panel of a Cabinet--.

In the References Cited:

"669,489" should read --669,482--.

In the Specification:

Column 1, line 1, "Control Mechanism for Sliding Panel" should read --Guide and Brake Mechanism for a Sliding Panel of a Cabinet--.

UNITED STATES PATENT AND TRADEMARK OFFICE
CERTIFICATE OF CORRECTION

PATENT NO. : 5,645,144
DATED : July 8, 1997
INVENTOR(S) : Schaefers et al.

It is certified that error appears in the above-identified patent and that said Letters Patent is hereby corrected as shown below:

Column 4, line 32, "compromising" should read --comprising--.

Column 4, line 40, "the into contact" should read --the brake into contact--.

Column 4, line 44, "the and the" should read --the brake and--.

Signed and Sealed this

Third Day of February, 1998

Attest:

BRUCE LEHMAN

Attesting Officer

Commissioner of Patents and Trademarks